United States Patent
Horie

(10) Patent No.: US 6,498,227 B1
(45) Date of Patent: Dec. 24, 2002

(54) FLAME RETARDANT, FIBER-TREATMENT, A METHOD FOR IMPARTING FLAME RETARDANCY, AND FLAME RESISTANT POLYESTER TEXTILE MATERIALS

(75) Inventor: Seiji Horie, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 238 days.

(21) Appl. No.: 09/625,721

(22) Filed: Jul. 26, 2000

Related U.S. Application Data

(63) Continuation-in-part of application No. PCT/JP98/00279, filed on Aug. 24, 1999.

(51) Int. Cl.$^7$ ............................................. C08G 63/00
(52) U.S. Cl. ...................... 528/176; 442/59; 528/193; 528/194; 428/364; 428/373
(58) Field of Search ............................ 442/59; 528/176, 528/193, 194; 428/364, 373

(56) References Cited

FOREIGN PATENT DOCUMENTS

| EP | 0469354 A2 | 2/1992 |
|---|---|---|
| JP | 6330465 | 11/1994 |

*Primary Examiner*—Terressa M. Boykin
(74) *Attorney, Agent, or Firm*—Connolly Bove Lodge & Hutz LLP

(57) ABSTRACT

It is an object of the present invention to provide a fiber-treatment capable of providing improved flame retardancy towards synthetic fiber comprising polyester.

This invention provides a flame retardant for polyester-based synthetic fiber, comprising a polyester having a weight-average molecular weight of about 500 to about 20,000, said polyester being obtained from (A) an aromatic dicarboxylic acid component having no anionic group other than the carboxylic groups, (B) a diol and (C) a phosphinic acid derivative represented by the formula:

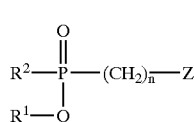

(1)

wherein $R^1$ and $R^2$ are independently selected from the group consisting of hydrogen atom and hydrocarbyl groups containing 1–22 carbon atoms, or $R^1$ and $R^2$ are joined into a divalent group to form a ring together with the phosphorus and oxygen atoms; n is 0, 1 or 2; and Z is a monovalent succinic residue represented by

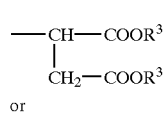
(2)

or

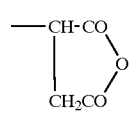
(3)

wherein $R^3$ is a hydrogen atom or an alkyl group containing 1–4 carbon atoms;
the molar ratio of the components (A)/(B)/(C) being 1/0.8–9/0.2–5.

20 Claims, No Drawings

FLAME RETARDANT, FIBER-TREATMENT, A METHOD FOR IMPARTING FLAME RETARDANCY, AND FLAME RESISTANT POLYESTER TEXTILE MATERIALS

This application is a continuation-in-part of PCT/JPa8/00279 filed Oct. 24, 1999.

BACKGROUND OF THE INVENTION

1. Field of the Invention

This invention relates to a flame retardant. More particularly, it relates to a flame retardant useful as a fiber-treatment for imparting flame retardancy to polyester textile materials.

2. Description of the Prior Art

There have been proposed several fiber-treatments for imparting flame retardancy to polyester textile materials, for example, (1) an aqueous dispersion of hexabromocyclododecane (JPN Patent Lay-open No.137377/1982), and (2) an aqueous dispersion comprising (A) a phosphorus-containing polyester composed of polycarboxylic components comprising a metal sulfonate group-containing aromatic dicarboxylic acid, (B) a water-soluble organic solvent and (C) water (JPN Patent Lay-open No.27741/1983).

The use of such a halogen-containing compound as in the above (1), however, has a problem of environmental pollution.

The use of such a phosphorus-containing polyester having a metal sulfonate group in the above (2) has no such problem, but is not always satisfied with respect to durability of flame retardancy.

SUMMARY OF THE INVENTION

It is an object of the present invention to provide a fiber-treatment capable of providing improved flame retardancy towards synthetic fiber comprising polyester.

It is another object of this invention to provide a halogen-free flame retardant for polyester-based synthetic fiber of improved durability.

It is still another object of the present invention to provide a flame resistant polyester-based textile material of improved resistances to washing and dry-cleaning.

It is yet another object of the present invention to provide a method for imparting flame retardancy to a polyester-based textile material through post-finishing.

Briefly, these and other objects of this invention as hereinafter will become more readily apparent have been attained broadly by: a fiber-treatment comprising a polyester obtained from (A) an aromatic dicarboxylic acid component, (B) a diol and (C) a phosphinic acid derivative represented by the formula (1).

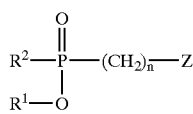
(1)

In the formula (1), $R^1$ and $R^2$ are independently selected from the group consisting of hydrogen atom and hydrocarbyl groups containing 1–22 carbon atoms, or $R^1$ and $R^2$ are joined into a divalent group to form a ring together with the phosphorus and oxygen atoms; n is 0, 1 or 2; and Z is a monovalent succinic residue represented by

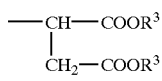
(2)

or

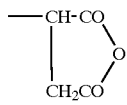
(3)

wherein $R^3$ is a hydrogen atom or an alkyl group containing 1–4 carbon atoms.

The aromatic dicarboxylic acid component (A) has no anionic group other than the carboxylic groups.

The molar ratio of (A)/(B)/(C) is 1/0.8–9/0.2–5.

The polyester has a weight-average molecular weight (hereinafter referred to as Kw) of about 500 to about 20,000.

The fiber-treatment is applied to synthetic fibers comprising polyester or textile materials therefrom to impart flame retardancy.

DETAILED DESCRIPTION OF THE PREFERRED EMBODIMENTS

Suitable polyesters include ones obtainable by esterifying or transesterifying (A) an aromatic dicarboxylic acid or an ester-forming derivative thereof with the components (B) and (C).

Suitable aromatic dicarboxylic acids include ones represented by the general formula;

wherein Ar is a divalent aromatic hydrocarbon group containing 6–20 or more carbon atoms, which may contain one or more ether linkages or a sulfone group, for example, phenylene, alkyl-substituted phenylene, biphenylene, phenylmethylphenylene, naphthylene, phenoxyethoxyphenylene and phenylsulfonyl-phenylene groups.

Illustrative of suitable aromatic dicarboxylic acids are unsubstituted or alkyl-substituted benzenedicarboxylic acids, such as phthalic, isophthalic and terephthalic acids, toluenedicarboxylic acids, 4,4'-diphenyldicarboxylic acid, 4,4'-diphenylmethanedicarboxylic acid, 4,4'-diphenylsulfonedicarboxylic acid, diphenoxyethanedicarboxylic acids (such as 4,4, -dicarboxy-α, β-diphenoxyethane), and naphthalenedicarboxylic acids (such 2,6- and 2,7-isomers).

Examples of suitable ester-forming derivatives include anhydrides, such as phthalic anhydride, lower alkyl (containing 1–4 carbon atoms; such as methyl and butyl) esters, such as dimethyl terephthalate, and acid halides (such as chlorides).

Among these, preferred are terephthalic acid and dimethyl terephthalate.

Suitable diols (B) include i) dihydric alcohols, for example, straight-chain and branched aliphatic diols, including alkylene glycols and alkenylene glycols, containing 2–12 carbon atoms, such as ethylene glycol, 1,2- and 1,3-propylene glycols, 1,4-butanediol, neopentyl glycol, 1,4-butenediol, 1,5-pentanediol and 1,6-hexanediol; cycloaliphatic diols containing 6–30 carbon atoms, such as 1,4-cyclohexane dimethanol and hydrogenated bisphenol A; and ii) oxyalkylated diols (including oxyalkylene diols and polyoxyalkylene diols), for example, alkylene oxide adducts of the above i), including polyalkylene glycols, such as diethylene glycol, dipropylene glycol, polyethylene glycols, polypropylene glycols and polytetramethylene glycols; and alkylene oxide adducts of dihydric phenols (monocyclic dihydric phenols, such as hydroquinone and alkyl-substituted hydroquinones having 1–4 alkyl groups containing 1–8 carbon atoms in each alkyl group; and bisphenols of the formula: HO—Ph—X—Ph—OH (wherein Ph is phenylene group, and X is direct linkage, alkylene, alkylidene or alkylene ether containing up to 8 carbon atoms, ether, sulfone, thioether or ketone linkage), such as bisphenol A, bisphenol F and bisphenol S); as well as combinations of two or more of these. Suitable alkylene oxides include ones containing 2–4 or more carbon atoms, for example, ethylene oxide, propylene oxide, 1,2-, 2,3-, 1,3- and 1,4-butylene oxides, and substituted alkylene oxides, such as styrene oxide and epichlorohydrin, as well as combinations of two or more of these alkylene oxides.

Molecular weight, as determined from hydroxyl number, of the diol (B) is not particularly restricted, but preferably not more than about 1,000 (particularly not more than about 500), in view of flame retarding effects of the resulting polyester.

Among these, preferred are dihydric alcohols, particularly alkylene glycols containing 2–10 carbon atoms. More preferred are alkylene glycols containing 2–6 carbon atoms, especially ethylene glycol.

In the general formula (1), suitable hydrocarbyl groups of $R^1$ and $R^2$ include i) straight-chain and branched alkyl groups containing 1–22 carbon atoms (preferably 1–6 carbon atoms), for example, methyl, ethyl, n- and i-propyl, n-, i-, sec- and t-butyl, n-pentyl, 3-methylbutyl, n-hexyl, 2-ethylbutyl, n- and i-heptyl, 2-ethylhexyl, n- and i-nonyl, n- and i-decyl, n-dodecyl, n-hexadecyl, n-octadecyl, n-icosyl and n-docosyl; ii) straight-chain and branched alkenyl groups containing 2–22 carbon atoms (preferably 2–6 carbon atoms), for example, vinyl, 1-propenyl, 2-propenyl, 2-butenyl, 2-pentenyl, decenyl, dodecenyl, tridecenyl, hexadecenyl, octadecenyl, icosenyl and docosenyl; cycloalkyl groups containing 5 or 6 carbon atoms, for example, cyclopentyl and cyclohexyl; aryl groups containing 6–14 carbon atoms, for example, phenyl, mono-, di-, tri- and tetra-alkyl-substituted phenyls (containing 1–8 carbon atoms in each alkyl group; such as tolyl, xylyl, mesityl, cumenyl and octylphenyl), biphenyl, naphthyl, anthryl and phenanthryl (preferably phenyl and biphenyl); aralkyl groups containing 1–4 carbon atoms in the alkylene group, preferably benzyl and phenethyl. Among hydrogen atom and these hydrocarbyl groups as $R^1$ and $R^2$, preferred are hydrogen atom and lower alkyl groups, particularly methyl group, in view of flame retarding effects of the resulting polyester.

Suitable divalent group of joined $R^1$ and $R^2$ to form a ring together with the phosphorus and oxygen atoms include alkylene groups containing 2–44, preferably 2–12 carbon atoms, for example, polymethylene groups of the general formula:

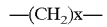

wherein x is an integer of 2–22 or more, preferably 3–12, (each of the methylene group may carry a lower alkyl substituent containing 1–4 carbon atoms), such as trimethylene group; and biarylene groups containing 12–76 carbon atoms, for example, unsubstituted and alkyl-substituted biphenylene groups (each of the phenylene groups may carry 1–4 alkyl substituents containing 1–8 carbon atoms), represented by the general formula:

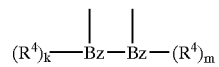

wherein Bz is a benzene nucleus; k and m are the same or different integers of 0–4, preferably 0–2, particularly 0; and $R^4$ is an alkyl group containing 1–8 carbon atoms [Plural (m+k) $R^4$s may be the same or different.], such as 2,2'-biphenylene group and 2,2'-biphenylene groups substituted with 1–8 alkyl groups containing 1–8 carbon atoms in each alkyl group. Among these, preferred are mono- and di-alkyl ($C_{1-4}$)-substituted 2,2'-biphenylene groups and particularly 2,2'-biphenylene group.

Monovalent succinic residues Z represented by the formulae (2) and (3) include residues of succinic acid and of ester-forming derivatives thereof. Among these, preferred are dimethyl succinate residue of the formula (2), wherein $R^3$s are methyl groups, and succinic anhydride residue of the formula (3).

Illustrative of the phosphinic acid derivative (C) are those having $R^1$, $R^2$, n and Z as follows:

| Compound | $R^1$ | $R^2$ | n | z |
|---|---|---|---|---|
| (C1) | methyl | methyl | 0 | dimethyl succinate residue |
| (C2) | methyl | methyl | 1 | succinic anhydride residue |
| (C3) | phenyl | phenyl | 0 | succinic acid residue |
| (C4) | phenyl | phenyl | 1 | dimethyl succinate residue |
| (C5) | trimethylene | | 1 | dimethyl succinate residue |
| (C6) | 2,2'-biphenylene | | 0 | dimethyl succinate residue |
| (C7) | 2,2'-biphenylene | | 1 | dimethyl succinate residue |
| (C8) | 2,2'-biphenylene | | 1 | succinic anhydride residue |

Among these, preferred are the compounds (C6), (C7) and (C8), and particularly (C6) and (C7).

The above phosphinic acid derivative (C) can be produced, for example, by reacting a phosphinic ester of the formula:

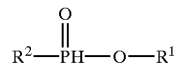

with an unsaturated compound of dicarboxylic functionality Suitable phosphinic esters of the above formula include, for example, 9,10-dihydro-9-oxa-10-oxide (hereinafter referred to as DOP). Exemplarly of suitable unsaturated compounds are unsaturated dicarboxylic acids, such as itaconic, maleic and vinylsuccinic acids, and ester-forming derivatives (such as anhydride and lower alkyl esters) of them, such as methyl itaconate and maleic anhydride. In carrying out the reaction, it is preferred to use the phosphinic ester and the unsaturated compound in equimolar ratio, either of which may also be used in a slight excess (such as up to 10% excess).

In producing the phosphinic acid derivative (C), starting materials (such as DOP and methyl itaconate) are mixed together usually at room temperature, followed by heating up the mixture under stirring within an atmosphere of inert gas (such as nitrogen) generally to a temperature of not lower than 100° C., preferably 120–200° C. It is often desirable to use a metal alkoxide as a catalyst to increase the reaction rate. Suitable metal alkoxides include, for example, alkali metal alkoxides containing 1–4 or more carbon atoms, such as sodium methoxide, sodium ethoxide and potassium ethoxide. The reaction may be carried out in the presence of a lower alcohol, such as methanol, ethanol, iso-propanol, n-butanol or the like, for suppressing side reactions.

In producing polyesters from (A) an aromatic dicarboxylic acid component, (B) a diol and (C) a phosphinic acid derivative according to the present invention, the molar ratio of (A)/(B)/(C), which can vary widely, is usually 1/0.8–9/0.2–5, preferably 1/1–7/0.3–3, more preferably 1/1.5–5/0.5–2.5. Equivalent ratio of hydroxyl group to carboxyl group is preferably 0.7–1.5 /1, more preferably 1–1.2/1.

Polyesters in accordance with the present invention, can be produced from (A), (B) and (C), through known polyesterification methods. In general, (A), (B) and (C) are subjected, in a known manner, to dehydration or dealcohol reaction to proceed esterification or transesterification, followed by polycondensation.

Esterification or transesterification can be carried out under heating (A), (B) and (C) for generally 1–20 hours, preferably 2–10 hours, at a temperature of usually 150–280° C., preferably 160–260° C., at normal pressure, under pressure or under reduced pressure.

Polycondensation can be done under heating the resulting esterified or transesterified product for generally 1–20 hours, preferably 0–10 hours, at a temperature of usually 200–320° C., preferably 220–280° C., under reduced pressure of usually 0.1–3 mmHg, preferably 0.1–1 mmHg.

The reaction (esterification or transesterification, and/or polycondensation) may be carried out in the presence of a catalyst. Illustrative of suitable catalysts are oxides of manganese, antimony, cobalt, zinc, titanium, cadmium and lead, and salts of these metals with boric acid, phosphorus acid, phosphoric acid, aliphatic carboxylic acid (containing 1–18 preferably 1–6 carbon atoms; mono-carboxylic acids, such as acetic, caproic, n-octanoic, 2-ethylhexanoic, stearic, linoleic and naphthenic acids; hydroxymonocarboxylic acids, such as glycolic acids; and dicarboxylic acids, such as malonic, succinic and adipic acids) or alkoxides (containing 1–18 preferably 1–6 carbon atoms, such as butoxide); for example, zinc oxide, lead oxide, antimony trioxide, manganese acetate, manganese octanoate, manganese tetraborate, cobalt acetate, antimony glycolate and titanium tetrabutoxide; and salts of alkaline earth or alkali metal (such as magnesium, calcium, barium, lithium, sodium and potassium) with carbonic acid or aliphatic carboxylic acid as mentioned above, for example, lithium acetate, potassium carbonate, calcium glycolate, calcium acetate and so on; as well as combinations of two or more of these catalysts. Among these, preferred are manganese carboxylates (particularly acetate), lithium carboxylates (particularly acetate) and antimony trioxide, especially combinations of them. Catalysts can be used in an amount of generally 0.01–3, preferably 0.03–1based on the total weight of (A) and (C). In the above and hereinafter, % represents % by weight.

Polyesters, in accordance with the present invention, usually have an Mw of about 500 to about 20,000, preferably about 1,000 to about 15,000, more preferably about 5,000 to about 15,000. Polyesters having an Mw of less than 500 result in insufficient durability when used as fiber treatment; while polyesters having an Mw exceeding 20,000 are of poor dispersibility and insufficiently adsorbed onto polyester-based synthetic fiber. Polyesters used in this invention preferably have an acid number of not higher than 125, particularly not higher than 60.

Polyesters, according to the invention, generally have a phosphorus content of 0.5 to 10%, preferably 1 to 8%, more preferably 4 to 6% by weight. Polyesters of phosphorus content smaller than 0.5% result in fibers treated therewith of insufficient flame retardancy; whereas polyester-based synthetic fibers treated with polyesters of a phosphorus content higher than 10% provide dyeings of poor color fastness to rubbing.

Polyesters of (A), (B) and (C), in accordance with the present invention, are useful as flame retardants and flame-retarding ingredients for fiber-treatments, particularly flame retardants and treating agents for polyester-based synthetic fibers.

Fiber-treatment, comprising a polyester of (A), (B) and (C) according to this invention as a flame-retarding ingredient, may further contain a surfactant.

Suitable surfactants include, those disclosed in U.S. Pat. No. 4,331,447, incorporated by reference. Illustrative of suitable surfactants are (1) nonionic surfactants, for example, polyoxyalkylene group-containing ones (having 2–50 moles or more of oxyalkylene groups, containing 2–4 or more carbon atoms in each alkylene group), such as polyoxy-alkylene ethers of a straight-chain or branched aliphatic alcohol containing 6–20 or more carbon atoms, polyoxy-alkylene ethers of an alkylphenol containing 6–12 or more carbon atoms in the alkyl group, polyoxyalkylene ethers of a styrenated phenol (1–20 moles styrene adduct of mono- or polycyclic phenol which may have an alkyl substituent containing 1–12 or more carbon atoms), polyoxyalkylene esters of a fatty acid containing 10–20 or more carbon atoms, polyoxyalkylene polyhydric alcohol (having 3–8 hydroxyl groups, such as glycerol, sorbitan and sucrose) fatty acid (containing 10–20 or more carbon atoms) esters, polyoxyalkylene alkylamines containing 10–20 or more carbon atoms in the alkyl group, polyoxyalkylene fatty amides containing 5–24 or more carbon atoms in the acyl group, and polyoxyethylene polyoxypropylene polyols (such as Pluronic type and Tetronic type surfactants); and polyhydric alcohol moiety-containing ones, for instance, fatty acid (containing 10–20 or more carbon atoms) esters of a polyhydric alcohol (having 2–8 hydroxyl groups, such as glycerol, sorbitan, sucrose and methyl glucoside); (2) anionic surfactants, for example, sulfate ester salts, such as straight-chain and/or branched alkyl sulfates containing 6–20 or more carbon atoms in the alkyl group, alkyl ether sulfates or polyoxyalkylene alkyl ether (containing up to 50 oxyalkylene units) sulfates containing 6–20 or more carbon atoms in the alkyl group, polyoxyalkylene alkylphenyl ether (containing up to 50 oxyalkylene units) sulfates containing 6–20 or more carbon atoms in the alkyl group, sulfated fatty acid esters containing 10–20 or more carbon atoms, and the like; sulfonic acid salts, such as alkylbenzene sulfonates containing 6–20 or more carbon atoms in the alkyl group, (alkyl)naphthalene sulfonates containing up to 20 carbon atoms in the alkyl group, dialkyl sulfosuccinates containing 6–20 or more carbon atoms in the alkyl group and so on; phosphate ester salts, such as straight-chain and/or branched alkyl phosphates containing 6–20 or more carbon atoms in the alkyl group, alkyl ether phosphates or polyoxyalkylene alkyl ether (containing up to 50 oxyalkylene units) phosphates containing 6–20 or more carbon atoms in the alkyl group, polyoxyalkylene alkylphenyl ether (containing up to 50 oxyalkylene units) phosphates containing 6–20 or more carbon atoms in the alkyl group, and the like; as well as combinations of two or more of these surfactants. Among these surfactants, preferred are polyoxyalkylene alkyl ethers, polyoxyalkylene alkylphenyl ethers, polyoxyalkylene ethers of a styrenated phenol; particularly polyoxyethylene (18 moles) lauryl ether and polyoxyethylene (15 moles) nonylphenyl ether.

Fiber-treatment can contain one or more surfactants in an amount of usually 0.01–100%, preferably 0.1–80%, based on the weight of said polyester.

Fiber-treatment according to the invention comprising a polyester of (A), (B) and (C) can be used in the form of a dispersion or solution in water and/or an organic solvent, preferably dispersion in water.

Methods for preparing such a dispersion or a solution are not particularly restricted, and include, for instance, those by mixing the polyester with an organic solvent and a surfactant (such as a nonionic or anionic surfactant as mentioned above) at room temperature or an elevated temperature (usually 25–95° C., preferably 70–90° C.) into a homogeneous solution, followed by gradually adding thereto warm water (usually 30–95° C., preferably 70–90° C.) to cause emulsification or dispersion.

Suitable organic solvents include, hydrophilic or water-soluble ones, for example, ketones containing 3–12 or more carbon atoms, such as acetone and methyl ethyl ketone; cyclic or non-cyclic ethers containing 4–20 or more carbon atoms, such as dioxane, cellosolves (such as methyl, ethyl and butyl cellosolves and acetates of them) and carbitols (such as methyl, ethyl and butyl carbitols and acetates of them); amides containing 3–12 or more carbon atoms, such as dimethylformamide (hereinafter referred to as DMF) and dimethylacetoamide; sulfoxides containing 2–12 or more carbon atoms, such dimethylsulfoxide, and the like; hydrophobic or water-insoluble ones, for instance, aromatic hydrocarbons containing 6–20 or more carbon atoms, such as toluene, xylenes and alkylnaphthalenes; halogenated hydrocarbons containing 1–14 or more carbon atoms, such methylene chloride and chloroform, and the like; and mixtures of two or more of them. Among these, preferred are hydrophilic solvents More preferred are amides particularly DMF.

Any known mixing or dispersing means or devices may be used for mixing and dispersing the components. Suitable devices usable for this purpose include, for example, wet-blending devices or water-grinders of various types (including horizontal types, such as "Viscomill" devices produced by Imex, and vertical type, such as sand grinders, produced by Imex). Among these, preferred are horizontal type water-grinders, such as "viscomill" devices.

There can be prepared milky white dispersions having an average particle size (volume average particle size) of generally 0.01–5 microns, preferably 0.01–1 microns.

The fiber-treatment of this invention in the form of a dispersion is diluted with water to form a treatment liquor, which is applied onto synthetic fiber material. Methods for preparing such a treatment liquor are not particularly restricted, and include, for example, those by adding the fiber-treatment into water under stirring, and those by stirring after adding the fiber-treatment into water. Among these, preferred are those by adding the fiber-treatment into water under stirring.

Typical formulations (%) of suitable fiber-treatments and suitable treatment liquors are as follows.

|  | Fiber-treatment | Treatment liquor |
| --- | --- | --- |
| Nonvolatile matters | 10–50 (15–45) | 0.01–50 (0.1–25) |
| Polyester | 5–45 (10–40) | 0.01–45 (0.1–20) |
| Surfactant | 0.001–45 (0.01–35) | ≦45 (≦18) |
| Dispersion medium | 50–90 (55–85) | ≧50 (≧75) |

-continued

|  | Fiber-treatment | Treatment liquor |
| --- | --- | --- |
| Water | 50–90 (55–85) | ≧50 (≧75) |
| Organic solvent | ≦30 (0.1–20) | ≦30 (≦20) |

Parenthesized are preferable ranges.

Suitable polyester-based synthetic fiber materials, to be treated with the flame retardant or the fiber-treatment according to this invention, include, fibers of polyesters, for example, polyalkylene terephthalates, such as polyethylene terephthalate, polypropylene terephthalate and polybutylene terephthalate, polyalkylene naphthalates, such as polyethylene naphthalate, polypropylene naphthalate and polybutylene naphthalate; co-condensation polyesters, such as polyethylene terephthalate/isophthalate, poly-ethylene terephthalate/5-sodiosulfoisophthalate, poly-ethylene terephthalate/polyoxybenzoate, polyethylene terephthalate/diphenoxyethanedicarboxylate, polybutylene terephthalate/isophthalate and the like; and textile materials comprising a polyester fiber as mentioned, for instance, textile raw materials, such as staple fibers, filaments, yarns, tows, tops and skeins; fabrics, such as knitted, woven and non-woven fabrics; and other textile goods, such as curtains, carpets, wall coverings, ceiling coverings and furniture covering, and automotive interior trims and linings (such as upholstery and floor sheets); as well as conjugate fibers, fiber blends, blended or union yarns, textile blends and mixed or union fabrics of a polyester as mentioned above with another fibrous material. Examples of such fibrous materials include natural fibers (such as cotton), regenerated fibers (such as rayons), semisynthetic fibers (such as cellulose acetate), and synthetic fibers (such as nylons and acrylic fibers), as well as combinations of two or more of them.

In applying onto synthetic fiber materials, one or more other of textile finishing agents, auxiliaries and dyes may be used in combination with the flame retardant or the fiber-treatment of the invention, in the same liquor, or as a separate treatment liquor, simultaneously or subsequently. Exemplary of suitable textile finishing agents and auxiliaries are handling touch-modifiers, including softening agents (such as cationic surfactants and silicone oils) and hard-finishing agents (such as acrylic resins), hydrophilicity- or hygroscopicity-imparting and antistatic agents (such as polyesters containing sulfonic acid salt groups, and vinyl polymers containing quaternary ammonium salt groups), soil-release finishing (such as polyesters containing water-solvatable polyoxyalkylene groups), oil and/or water repellants and water-proofing agents (such as fluorine-containing ones and silicone-containing ones), anti-slip agents (such as colloidal silica), wash and wear finishing and crease-resistant finishing (such as polyurethane resins), sanitize finish (such as quaternary ammonium salts), dyebath auxiliaries, including leveling agents, dispersants and retarding agents (such as nonionic surfactants), and fixing agents and improvers of fastness to solvents, laundering, heat, light and rubbing (such as aromatic amines). Suitable dyes include ones usually employed for synthetic fiber materials comprising polyester, particularly disperse dyes.

The flame retardant or the fiber-treatment of the invention may be applied onto polyester-based synthetic fiber materials before dyeing or after dyeing, but it is preferred in view of operating efficiency to apply it simultaneously with dyeing.

Typical formulations (%) of suitable treatment liquors used for simultaneous dyeing (dyeing liquors) are as follows. Parenthesized are preferable ranges.

| | |
|---|---|
| Nonvolatile matters | 0.01–50 (0.1–25) |
| Polyester | 0.01–45 (0.1–20) |
| Surfactant | ≦45 (≦18) |
| Dyes | 0.001–1 (0.005–0.5) |
| Leveling agent, dispersant or retarding agent | 0.01–1 (0.02–0.5) |
| Fixing agents or fastness improver | 0.01–1 (0.02–0.5) |
| Dispersion medium | ≧50 (≧75) |
| Water | ≧50 (≧75) |
| Organic solvent | ≦30 (≦20) |

The treatment liquor may be applied onto synthetic fiber materials in a known manner. Suitable methods include, for example, exhaustion (dipping), padding and spraying. Exhaustion is generally carried out at an elevated temperature under pressure (for instance, at 110–130° C. under 1–3 Kg·f/cm$^2$); while padding and spraying are done at room temperature. Among these, preferred is exhaustion.

Exhaustion can be done using any known application means. Exemplary of suitable machines used therefor are dyeing machines, including circulating-liquor machines and moving-fabric machines, for example, noncontinuous ones, such as high-pressure and normal-pressure winch dyeing machines, high-pressure and normal-pressure jiggers, jet dyeing machines, cheese dyeing machines, beam dyeing machines, drum dyeing machines and paddle dyeing machines. Among these, preferred are circulating-liquor machines and high-pressure winch dyeing machines.

Suitable machines for padding include, for example, continuous ones, such as continuous high-pressure dyeing machines, pad steam dyeing machines and thermosol dyeing machines, and semicontinuous ones, such as pad roll dyeing machines.

Suitable machines for spraying include, for example, spray guns, including fixed sprayguns (such as oscillating, reciprocating and swinging ones).

In general, the treatment liquor is applied onto synthetic fiber materials in a liquid ratio of 2–50:1, preferably 5–40:1, more preferably 10–30:1.

The flame retardant or the fiber-treatment of the invention may be applied onto polyester-based synthetic fiber materials before dyeing or after dyeing, but it is preferred that the same be applied simultaneously with dyeing from the work efficiency viewpoint.

After application of the flame retardant or the fiber-treatment of the invention, synthetic fiber materials are provided with the flame retardant or the fiber-treatment in an amount (nonvolatile content) of usually at least 0.05%, preferably at least 0.5%, more preferably at least 10% in view of flame retardancy, and generally at most 30%, preferably at most 20%, more preferably at most 15in view of handling touch of the treated fiber.

Synthetic fiber materials thus provided with the flame retardant or the fiber-treatment are dried and/or heat-treated.

Methods and conditions of drying and heat-treatment are not particularly restricted. Drying may be carried out generally for 30 seconds to 30 minutes, preferably 1–10 minutes, at a temperature of usually 80–130° C., preferably 110–120° C., under reduced pressure or normal pressure (optionally under air circulation). Any of known drying devices, drying machines, drying chambers, drying ovens and drying air can be used. Among these preferred are drying devices and drying machines. Heat-treatment can be done usually for 10 seconds to 10 minutes, preferably 30 seconds to 2 minutes, at a temperature of usually 150–200° C., preferably 160–180° C. For heat-treatment, there may be used pin-tenters, conveyor-tenters and air-cushion tenters. Among these preferred are pin-tenters.

Having generally described the invention, a more complete understanding can be obtained by reference to certain specific examples, which are included for purposes of illustration only and not intended to be limiting unless otherwise specified. In the following examples, parts and ratio mean parts by weight and weight ratio, respectively.

BEST MODES FOR CARRYING OUT THE INVENTION

The following examples further illustrate the present invention. They are, however, by no means limitative of the scope of the invention. In the examples, "part (s)" and "%" are "part(s) by weight" and "% by weight", respectively.

Example 1

Dimethyl terephthalate (131 parts), 75 parts of ethylene glycol and 127 parts of the phosphinic acid derivative shown above as compound (C4) as well as manganese acetate, lithium acetate and antimony trioxide, as catalysts, in amounts of 0.1%, 0.5% and 0.03% respectively, relative to the dimethyl terephthalate plus phosphinic acid derivative, were mixed up and transesterification was effected by heating the mixture to a temperature of 160 to 220 ° C. for 3 hours under atmospheric pressure. Then, after distilling off an approximately stoichiometric amount of methanol, the temperature of the system was raised to 240° C. and the pressure was gradually reduced to 1 torr or below, and the reaction was allowed to proceed for 3 hours, to give a polyester with an Mw of 5,500 and a phosphorus content of 4.1%.

This polyester (150 parts), 100 parts of dimethylformamide and 50 parts of a polyoxyethylene (15 moles) nonylphenyl ether were uniformly dissolved at 80° C. To the solution was gradually added 700 parts of hot water (80° C.) to form particles dispersed therein. After cooling the dispersion to ordinary temperature, the particles were water-ground in a continuous manner for 30 minutes using a Viscomill device (a water-grinder of horizontal type; a product of Imex) to give 1,000 parts of a fiber treatment (1) of the invention. The fiber treatment 1 (flame retardancy providing polyester content: 15%) occurred as a milk white dispersion and had a viscosity of 300 cp (25° C.), a mean particle size of 0.4 micron and a pH of 6.8.

Example 2

Dimethyl terephthalate (135 parts), 77 parts of ethylene glycol and 125 parts of the phosphinic acid derivative shown above as compound (C6) as well as manganese acetate, lithium acetate and antimony trioxide, as catalysts, in amounts of 0.1%, 0.5% and 0.03% respectively, relative to the dimethyl terephthalate plus phosphinic acid derivative, were mixed up and transesterification was effected by heating the mixture to a temperature of 160 to 220° C. for 3 hours under atmospheric pressure. Then, after distilling off an approximately stoichiometric amount of methanol, the temperature of the system was raised to 250° C. and the pressure was gradually reduced to 1 torr or below, and the reaction was allowed to proceed for 6 hours, to give a polyester with an Mw of 14,500 and a phosphorus content of 4.2%.

This polyester compound (150 parts), 100 parts of dimethylformamide, 30 parts of a polyoxyethylene (15 moles) nonylphenyl ether and 20 parts of a polyoxyethylene (20 moles) lauryl alcohol were uniformly dissolved at 80° C. To the solution was gradually added 700 parts of hot water (80° C.) to form particles dispersed therein. After cooling the dispersion to ordinary temperature, the particles were water-ground in a continuous manner for 30 minutes using a Viscomill device to give 1,000 parts of a fiber treatment (2) of the invention. The fiber treatment 2 (flame retardancy providing polyester content: 15%) occurred as a milk white dispersion and had a viscosity of 550 cp (25° C.), a mean particle size of 0.5 micron and a pH of 7.

Example 3

Dimethyl terephthalate (65 parts), 49 parts of ethylene glycol and 125 parts of the phosphinic acid derivative shown above as compound (C7) as well as manganese acetate, lithium acetate and antimony trioxide, as catalysts, in amounts of 0.1%, 0.5% and 0.03% respectively, relative to the dimethyl terephthalate plus phosphinic acid derivative, were mixed up and transesterification was effected by heating the mixture to a temperature of 160 to 220° C. for 3 hours under atmospheric pressure. Then, an approximately stoichiometric amount of methanol was distilled off and, thereafter, the procedure of Example 2 was followed to give a polyester, which had an Mw of 9,000 and a phosphorus content of 5.5%.

This polyester (150 parts), 100 parts of dimethylformamide, 30 parts of a polyoxyethylene (15 moles) nonylphenyl ether and 20 parts of a polyoxyethylene (18 moles) lauryl alcohol were uniformly dissolved at 80° C. To the solution was gradually added 700 parts of hot water (80° C.) to form particles dispersed therein. After cooling the dispersion to ordinary temperature, the particles were water-ground in a continuous manner for 30 minutes using a Viscomill device to give 1,000 parts of a fiber treatment (3) of the invention. The fiber treatment 3 (flame retardancy providing polyester content: 15%) occurred as a milk white dispersion and had a viscosity of 350 cp (25° C.), a mean particle size of 0.3 micron and a pH of 6.5.

COMPARATIVE EXAMPLE 1

The ingredients of the following formulation were mixed up and water-ground in a continuous manner for 1 hour using a Viscomill device to give 1,000 parts of a fiber treatment (4) (flame retardancy providing ingredient content: 40%) for comparison. The fiber treatment 4 occurred as a pale-yellowish milk white dispersion and had a viscosity of 1, 000 cp (25° C.), a pH of 6.5 and a mean particle size of 0.8 micron.

Formulation:

| | |
|---|---|
| 1,2,5,6,9,10-Hexabromocyclododecane | 400 parts |
| Polyoxyethylene (20 moles) nonylphenyl ether | 30 parts |
| Sodium lauryl sulfate | 10 parts |
| Carboxymethylcellulose sodium salt | 5 parts |
| Water | 555 parts |

COMPARATIVE EXAMPLE 2

A Fiber Treatment Containing a Polyester Resin Derived from Copolymerization of a Metal Sulfonate Group-containing Aromatic Dicarboxylic Acid Dimethyl terephthalate (62 parts), 10 parts of sodium 5-sulfoisophthalic acid, 50 parts of ethylene glycol and 120 parts of the phosphinic acid derivative shown herein on page 8 as compound (C7) as well as manganese acetate, lithium acetate and antimony trioxide, as catalysts, in amounts of 0.1%, 0.5% and 0.03% respectively, relative to the total weight of the dimethyl terephthalate, sodium 5-sulfoisophthalic acid and phosphinic acid derivative, were mixed up and transesterification was effected by heating the mixture to a temperature of 160 to 220° C. for 3 hours under atmospheric pressure. Then, after distilling off an approximately stoichiometric amount of methanol, the reaction mixture was treated in the same manner as in Example 2, to give a polyester with an Mw of 9,000 and a phosphorus content of 5.5%.

This polyester (150 parts), 100 parts of dimethylformamide, 30 parts of a polyoxyethylene (15 moles) nonylphenyl ether and 20 parts of polyoxyethylene (18 moles) lauryl alcohol adduct were uniformly dissolved at 80° C. To the solution was gradually added 700 parts of hot water (80° C.) to form particles dispersed therein. After cooling the dispersion to ordinary temperature, the particles were water-ground in a continuous manner for 30 minutes using a Viscomill device to give 1,000 parts of a fiber treatment (5) for this comparasion. The fiber treatment 5 (flame retardancy providing polyester content: 15%) occurred as a milk white dispersion and had a viscosity of 350 cp (25° C.), a mean particle size of 0.3 micron and a pH of 6.5.

Flame Retardancy Test

The fiber treatments 1 to 5 were tested for their performance as flame retardants through carrying out high-temperature treatment and ordinary temperature treatment with each agent.

Test Method 1 (High-temperature Treatment)

An undyed woven polyester fabric weighing 300 g/m$^2$ was treated for 30 minutes at 130° C. within an aqueous dispersion containing 2% o.w.f. (on the weight of fiber; hereinafter the same shall apply) of a dye [Kayalon Polyester Navy Blue 2R-SF (a product of Nippon Kayaku)], 0.5 g/L of a dispersing and leveling agent [Ionet RAP-250 (a product of Sanyo Chemical Industries)] and 15% o.w.f. of a fiber treatment at a liquor ratio of 20:1, using a Color Master dyeing machine (a product of Tsujii Senki), and then washed with water and dried (100° C., 3 minutes), followed by heat treatment (170° C., 1 minute)

The fiber treatment was used in an amount of 15% o.w.f. in case of the fiber treatments 1 to 3 (flame retardancy providing polyester content: 15%), or in an amount of 7.5% o.w.f. in case of the fiber treatment 4 (flame retardancy providing ingredient content: 40%)

These were tested for flame retardancy according to method D of JIS L 1091. The results obtained are shown in Table 1.

The washing was done according to JIS L 1042 and the dry cleaning according to JIS L 1018.

TABLE 1

| | Flame retardancy (number of contacts with flame) | | |
|---|---|---|---|
| Fiber treatment | After treatment and drying | After 5 times washing | After 5 times dry cleanings |
| 1 | 5 | 5 | 5 |
| 2 | 5 | 5 | 5 |
| 3 | 5 | 5 | 5 |
| 4 | 4 | 4 | 3 |
| 5 | 2 | 2 | 2 |
| Blank | 1 | 1 | 1 |

Test Method 2 (Ordinary Temperature Treatment)

Using each of the fiber treatments 1 to 4, an undyed woven polyester fabric weighing 300 g/m$^2$ was subjected to padding treatment (80% squeezing) using the following bath, drying (100° C., 5 minutes) and heat set treatment (190° C., 50 seconds) and then to flame retardancy testing in the same manner as in Test method 1.

(Treatment Bath)

| | |
|---|---|
| Dye [Kayalon Polyester Navy Blue 2R-SF (a product of Nippon Kayaku)] | 10 g/L |
| Sodium alginate | 2 g/L |
| Fiber treatment (flame retardancy providing polyester content: 15%) | 200 g/L |

When the fiber treatment 4 (flame retardancy providing ingredient content: 40%) was used, it was used in an amount of 100 g/L.

TABLE 2

| | Flame retardancy (number of contacts with flame) | | |
|---|---|---|---|
| Fiber treatment | After treatment and drying | After 5 times washings | After 5 times dry cleanings |
| 1 | 5 | 5 | 5 |
| 2 | 5 | 5 | 5 |
| 3 | 5 | 5 | 5 |
| 4 | 4 | 4 | 3 |
| Blank | 1 | 1 | 1 |

<Adsorbability Tests>

Each of the fiber treatments 3 and 5 were evaluated for adsorbability. The results are shown in Table 3.

The adsorbability was calculated as follows:

Adsorbability (% o.w.f.)=[weight of a treated cloth after washing with water, drying and heat treatment following treatment]−[weight of a treatment target cloth before treatment]/[weight of a treatment target cloth before treatment]×100

The flame retardancy evaluation was performed according to method D of JIS L 1091. The results are shown in Table 1.

TABLE 3

| Fiber treatment | Absorbability (% o.w.f) |
|---|---|
| 3 | 2.2 |
| 5 | 0.8 |
| Blank | 0 |

<Storage stability>

After preparation of each fiber treatment, a sample thereof was allowed to stand at room temperature for 30 days and then evaluated for mean particle size and flame retardancy. Textile treatment and flame retardancy testing were carried out in the same manner as mentioned above.

The mean particle size reported is a value determined by the laser diffraction/scattering method of particle size distribution measurement.

The results are shown in Table 4.

TABLE 4

| | Mean particle size ($\mu$m) | | Flame retardancy (after treatment and drying) |
|---|---|---|---|
| Fiber treatment | Just after preparation | After 30 days | After 30 days |
| 3 | 0.3 | 0.3 | 5 |
| 5 | 0.3 | 1.6 | 1 |
| Blank | — | — | 1 |

What is claimed as new and desired to be secured by Letters Patent is:

1. A flame retardant for polyester based synthetic fiber, comprising a polyester having a weight-average molecular weight of about 500 to about 20,000, said polyester being produced from (A) an aromatic dicarboxylic acid component having no anionic group other than the carboxylic groups, (B) a diol and (C) a phosphinic acid derivative represented by the formula:

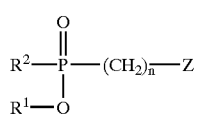

(1)

wherein $R^1$ and $R^2$ are independently selected from the group consisting of hydrogen atom and hydrocarbyl groups containing 1–22 carbon atoms, or $R^1$ and $R^2$ are joined into a divalent group to form a ring together with the phosphorus and oxygen atoms; n is 0, 1 or 2; and Z is a monovalent succinic residue represented by:

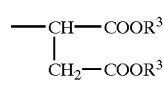

(2)

or

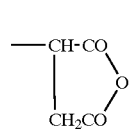

(3)

wherein $R^3$ is a hydrogen atom or an alkyl group containing 1–4 carbon atoms; the molar ratio of the components (A)/(B)/(C) being 1/0.8–9/0.2–5.

2. The flame retardant of claim 1,
wherein the component (A) is at least one selected from the group consisting of aromatic dicarboxylic acids represented by the general formula:

HOOC—Ar—COOH, wherein Ar is a divalent aromatic hydrocarbon group containing 6–20 carbon atoms, with or without one or more ether linkages or a sulfone group, and ester-forming derivatives of these aromatic dicarboxylic acids.

3. The flame retardant of claim 1,
wherein the component (A) is at least one selected from the group consisting of unsubstituted or alkyl-substituted benzenedicarboxylic acids, 4,4'-diphenyldicarboxylic acid, 4,4'-diphenylmethane-dicarboxylic acid, 4,4'-diphenyl-sulfonedicarboxylic acid, diphenoxyethanedicarboxylic acids, naphthalenedicarboxylic acids, anhydrides of these acids, esters of these acids containing 1–4 carbon atoms in each alkyl group and halides of these acids.

4. The flame retardant of claim 1, wherein the component (A) is at least one selected from the group consisting of terephthalic acid, dimethyl terephthalate, isophthalic acid and naphthalenedicarboxylic acids.

5. The flame retardant of claim 1, wherein $R^1$ and $R^2$ are independently selected from the group consisting of hydrogen atom, alkyl groups containing 1–22 carbon atoms, alkenyl groups containing 2–22 carbon atoms, cycloalkyl groups containing 5 or 6 carbon atoms, aryl groups containing 6–14 carbon atoms, and aralkyl groups containing 1–4 carbon atoms in the alkylene group.

6. The flame retardant of claim 1, wherein $R^1$ and $R^2$ are joined into a divalent group to form a ring together with the phosphorous and oxygen atoms, the divalent group being selected from the group consisting of alkylene groups containing 2–44 carbon atoms and biarylene groups containing 12–44 carbon atoms.

7. The flame retardant of claim 1 wherein the divalent group is selected from the group consisting of 2,2'-biphenylene group and 2,2'-biphenylene groups substituted with 1–8 alkyl groups containing 1–8 carbon atoms in each alkyl group.

8. The flame retardant of claim 1, wherein $R^1$ and $R^2$ are independently selected from the group consisting of methyl and phenyl groups, or $R^1$ and $R^2$ are joined into a trimethylene group or a 2,2'-biphenylene group to form a ring together with the phosphorus and oxygen atoms;

n is 0 or 1;

and Z is succinic acid residue or dimethyl succinate residue.

9. The flame retardant of claim 1, wherein the component (B) is at least one diol, having a molecular weight, determined from hydroxyl number, of not more than about 1,000, selected from the group consisting of aliphatic diols containing 2–12 carbon atoms, cycloaliphatic diols containing 6–30 carbon atoms, oxyalkylene diols and polyoxyalkylene diols containing 2–4 or more carbon atoms in each oxyalkylene group.

10. The flame retardant of claim 1, wherein the component (B) comprises ethylene glycol.

11. The flame retardant of claim 1, wherein said polyester has a phosphorus content of 0.5 to 10% by weight.

12. A fiber treatment for synthetic fiber comprised of a polyester, the treatment comprising the flame retardant of claim 1 and contains at least one surfactant in an amount of 0.01–100%, based on the weight of said polyester.

13. The fiber treatment of claim 12, which is in the form of a dispersion or solution in water, an organic solvent or a mixture thereof with water, the organic solvent being at least one selected from the group consisting of ketones, ethers, amides, sulfoxides, aromatic hydrocarbons and halogenated hydrocarbons.

14. The fiber treatment of claim 13, wherein the dispersion or solution contains 10–50% by weight of nonvolatile matters comprising 5–45% by weight of the polyester and 0.001–45% by weight of the surfactant dispersed or dissolved in 50–90% by weight of dispersion medium comprising 50–90% by weight of water and 0–30% by weight of the organic solvent.

15. A treatment liquor, comprising the fiber treatment of claim 12, diluted with water to a nonvolatile content of 0.01–50% by weight.

16. The treatment liquor of claim 15, which further comprises a dye and at least one dyebath auxiliary selected from the group consisting of leveling agents, dispersants, retarding agents and fixing agents and fastness improvers.

17. A process for imparting flame retardancy to a polyester-based textile material, which comprises treating a synthetic fiber comprising polyester or a textile material therefrom with the fiber treatment of claim 12.

18. The process of claim 17, which comprises treating an undyed textile material simultaneously with dyeing.

19. A method for imparting flame retardancy to a polyester-based textile material, which comprises the step treating a synthetic fiber comprising polyester or a textile material therefrom with the treatment liquor of claim 15, and the step of drying or heat-treating the treated synthetic fiber.

20. A flame resistant polyester-based textile material, having improved resistances to washing and dry-cleaning, comprising a textile material selected from the group consisting of polyester fibers; staple fibers, filaments, yarns, tows, tops, skeins, knits, woven fabrics, non-woven fabrics, curtains, carpets, wall coverings, ceiling coverings, furniture coverings, automotive interior trims and linings of a polyester fiber; and conjugate fibers, fiber blends, union yarns, textile blends and union fabrics of a polyester fiber with another synthetic fiber, a natural fiber, a regenerated fiber or a semisynthetic fiber; which textile material has been provided with the fiber treatment of claim 12.

* * * * *

UNITED STATES PATENT AND TRADEMARK OFFICE
CERTIFICATE OF CORRECTION

PATENT NO.    : 6,498,227 B1
DATED         : December 24, 2002
INVENTOR(S)   : Seiji Horie It is certified that error appears in the above-identified patent and that said Letters Patent is hereby corrected as shown below:

<u>Title page,</u>
Item [63], change filing date of Related U.S. Application Data "PCT/JP98/00279" "August 24, 1999" to -- January 26, 1998 --

Signed and Sealed this

Twenty-ninth Day of July, 2003

JAMES E. ROGAN
*Director of the United States Patent and Trademark Office*